Feb. 27, 1934.    R. THOMAS    1,949,339
DOUBLE LENS SYSTEM
Filed Dec. 5, 1933    4 Sheets-Sheet 1

INVENTOR:
RICHARD THOMAS,
By
Fad W Lewis
ATTORNEY

Feb. 27, 1934.    R. THOMAS    1,949,339
DOUBLE LENS SYSTEM
Filed Dec. 5, 1933    4 Sheets-Sheet 3

INVENTOR:
RICHARD THOMAS
By
ATTORNEY.

Feb. 27, 1934.   R. THOMAS   1,949,339
DOUBLE LENS SYSTEM
Filed Dec. 5, 1933   4 Sheets-Sheet 4

INVENTOR:
RICHARD THOMAS,
By
ATTORNEY.

Patented Feb. 27, 1934

1,949,339

UNITED STATES PATENT OFFICE 1,949,339

DOUBLE LENS SYSTEM

Richard Thomas, Los Angeles, Calif., assignor of one-half to William Jennings Bryan, Jr., Los Angeles, Calif.

Application December 5, 1933. Serial No. 700,982

30 Claims. (Cl. 88—16.4)

My invention relates to a novel optical method and system for dividing the light rays in any given field of focus into two parts and by novel means deflecting them to predetermined points in image areas and controlling the size of light passing apertures used in connection therewith. My invention finds particular application in those methods and systems of taking and projecting double image areas and specially in color photography in the additive system. One very important use of the invention is in conjunction with a camera, and it is in this connection that the apparatus of the invention will be particularly described. It should not be understood, however, that I am limited to this use, for the lens combinations and the diaphragm structure herein described may also be used in projection systems, or in other capacities either with or without modification.

One of the objects of the present invention is to perfect a method of and apparatus for taking pictures in which two adjacent lens systems are used, these lens systems being focused on a given objective field and projecting an image of an object in this field onto a film or other image-receiving surface in the image field of the lens systems without visible parallax. In the preferred embodiment the two image areas are positioned in adjacent relationship on the same photo-sensitive surface, the frames outlining these areas being simultaneously exposed through the respective lens systems.

Such a structure has many advantages over a single-lens system, if used in conjunction with a color or black-and-white process, one of the most important advantages is the shorter exposure which is made possible, especially if the images are later projected or printed in superimposed relation. So also, it is possible to obtain excellent results even under adverse light conditions. When the present invention is used in taking pictures by the use of artificial light, it becomes possible to use much lower light intensities than required with present commercial systems. The present invention also makes it possible to use much smaller lens systems than would be necessary if the same amount of light were to be passed through a single lens system.

I have found, however, that if an attempt is made to photograph an object moving toward a camera provided with two lens systems, corresponding points on the two resulting photographic images are not correspondingly placed on the two frames or image areas and do not remain spaced a constant distance from each other on the film as the object comes toward the camera, thus giving rise to what is commonly termed "parallax", especially if an attempt is made to superimpose or simultaneously project the images. This parallax is one of the chief causes of overlapping color or fringe in any simultaneous double exposure color system. And one of the chief advantages of my invention is my ability to therewith minimize and control this parallax. Thus, as the lens systems are focused on an object moving toward the camera, point images may be correspondingly placed in their respective frames at one focal distance, but will not be spaced a constant distance from each other at the other focal distances. Any attempt to superimpose such images by aligning the frames or the edges of these images is impossible, in the absence of a suitable correcting means, when the object is at one of these other focal distances.

It is an object of the present invention to provide a method of and an apparatus for accurately registering images on corresponding frames and maintaining constant the separation of corresponding points of these images when such images are formed by a pair of lens systems focused on an object, regardless of the distance between the camera and the object. The separation I now refer to is the separation of corresponding points of the images in the corresponding frames which is parallax. I do not here refer to the separation or spacing of the adjacent frames or picture areas. This eliminates all lack of registration and in effect wipes out visible parallax in the field of focus of the lens systems.

This and other desirable results I obtain in one form of the invention by correlating the focusing movement with an auxiliary adjustment to effect proper registration. This can be accomplished by suitably displacing the rays by shifting their position or bending or deflecting them so that they produce images which can be accurately superimposed by bringing the frames or the edges of these images into registration. Thus, considering either a camera or a projection system, it will be clear that if the two lens systems are focused on a given field in front of these lens systems, light rays drawn from a given point of this field through the optical axis of each lens system will be spaced from each other in the zone to the rear of the lens systems and will intersect the film at a pair of points spaced from each other. Changing the focus of the lens systems will tend to move these points toward or away from each other, and it is an object of the present invention to compensate for this change in spacing of the points by so displacing these rays that a predetermined separation of the frames is maintained while at the same time parallax is controlled and reduced to a minimum.

In one embodiment of the invention this displacement of the rays may be accomplished by shifting one element of each of the lens systems sidewise with respect to the other thereby changing the relative spacing thereof, and it is an object of the present invention to provide a lens structure including two lens systems positioned in adjacent relationship, the elements thereof movable relative to each other to change the spacing therebetween in response to changes in focus thereof.

Figures 1, 2, 3, 4:
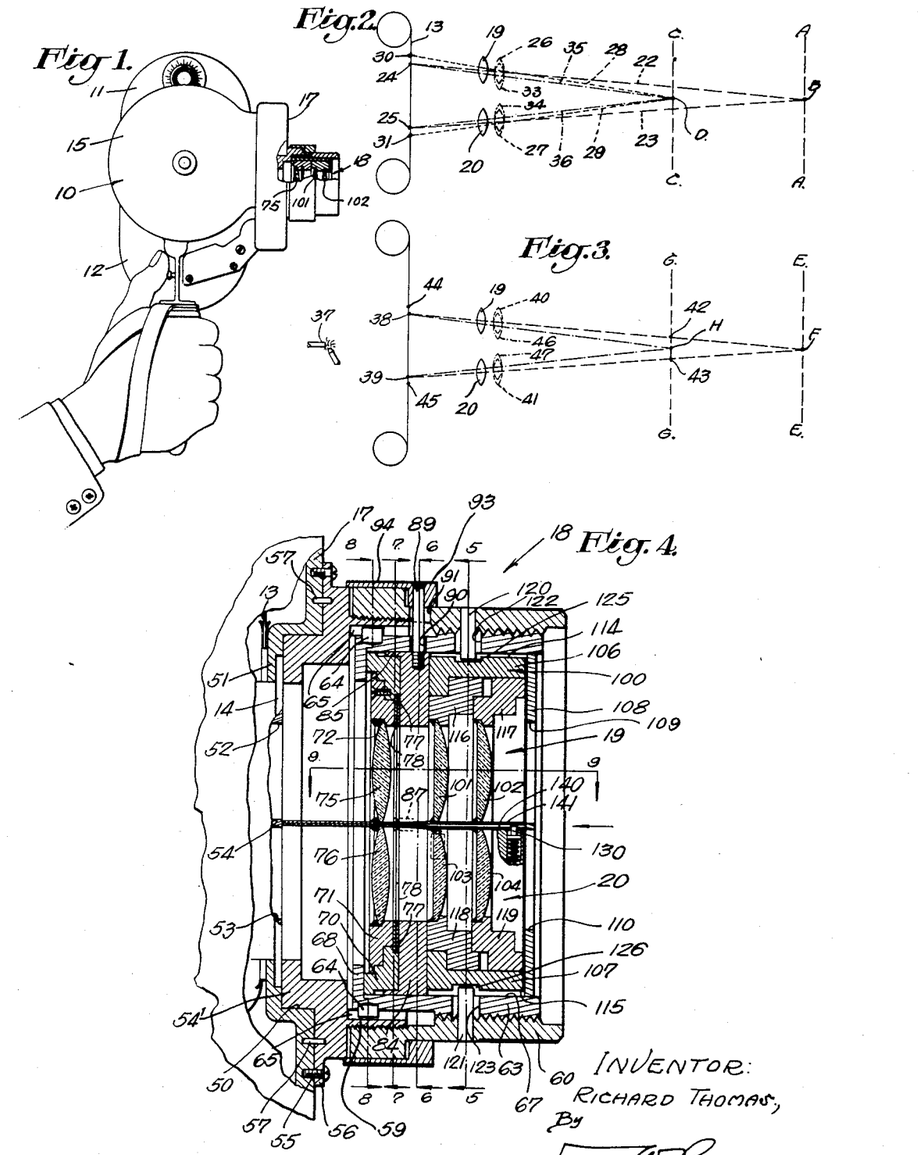
Fig. 1 is a side view of a camera incorporating the features of the invention.
Fig. 2 is a diagrammatic view illustrating the principles of the invention when applied to a system of taking pictures.
Fig. 3 is a diagrammatic view illustrating the principles of the invention when applied to a projection system.
Fig. 4 is a vertical sectional view of the lens structure of the invention.

In this embodiment of the invention which is illustrated in Fig. 4 the rear elements of each lens system are fixed together with the optical axes set at a predetermined separation and the front elements only are shifted to effect this displacement of the rays. The effect of this arrangement of the elements is to introduce a displacement of the rays which is just the reverse of the displacement obtained when front and rear elements together of adjacent lens systems are shifted. Thus where it is necessary in focusing on objects nearer to the camera to move the adjacent lens system further apart where both front and rear elements are moved in order to maintain the separation of frames, in my invention due to this reverse displacement the front elements are moved together in order to maintain this separation. It is this moving together of the front elements which reduces the parallax in the objective field of focus.

In other embodiments of the invention the rays can be displaced to maintain this spacing substantially constant by deflecting these rays by prisms in the zone between the film and the lens structures. It is a further object of the invention to provide such a deflecting means in the form of a prism structure in combination with the lens system.

Figures 8, 9, 10:
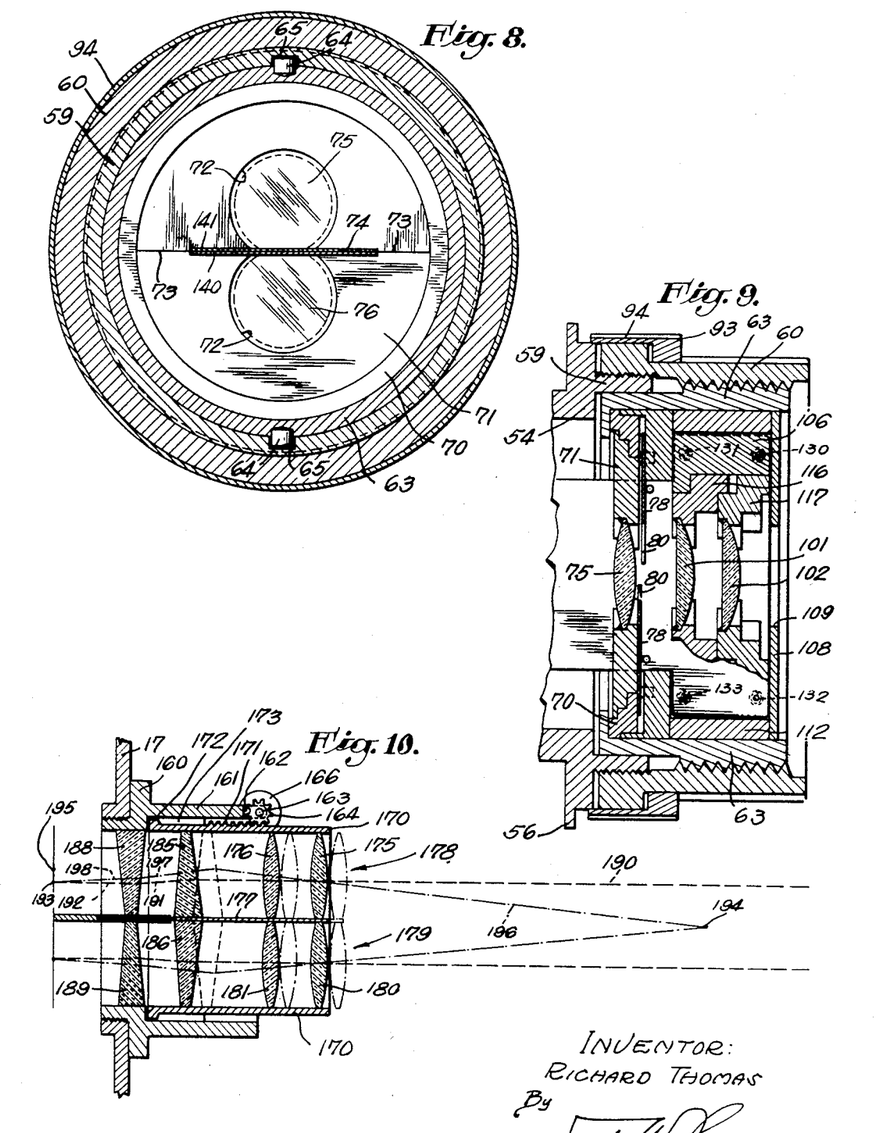
Fig. 9 is a horizontal sectional view taken on the line 9—9 of Fig. 4.
Fig. 10 is a vertical sectional view of an alternative form of the invention.
Figure 11:
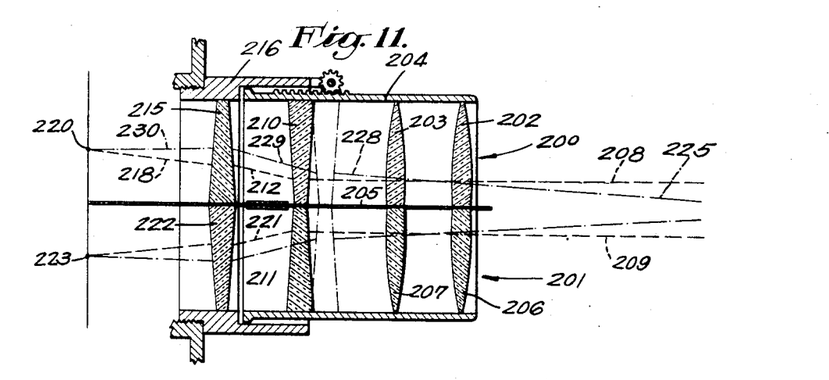
Figs. 11, 12, and 13 illustrate other forms of the invention.
Figure 13:
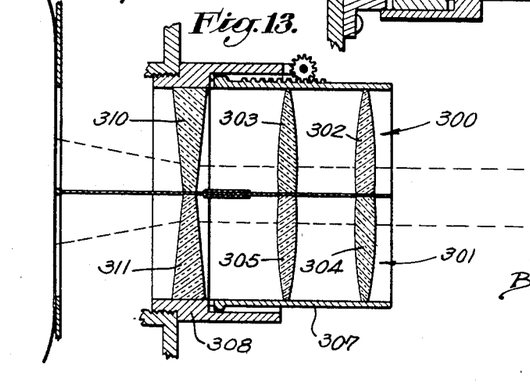

In the embodiments of the invention as illustrated in Figs. 10, 11 and 13, it will be seen that the function of the prisms structures is to simultaneously compensate for the change of spacing of corresponding points in the images due to change of focus in the objective fields by refractive displacement of the rays and in the embodiments as hereinafter described, it is necessary to grind off the adjacent portions of the lens elements forming the two lens systems so that their optical axes may be positioned a distance apart not greater than the center to center spacing of the apertures or film areas which they cover. It will be seen that in these embodiments the shaping and positioning of the lens used in conjunction with the prisms, with their optical axes spaced close together, reduces visible parallax to an absolute minimum.

Figure 12:
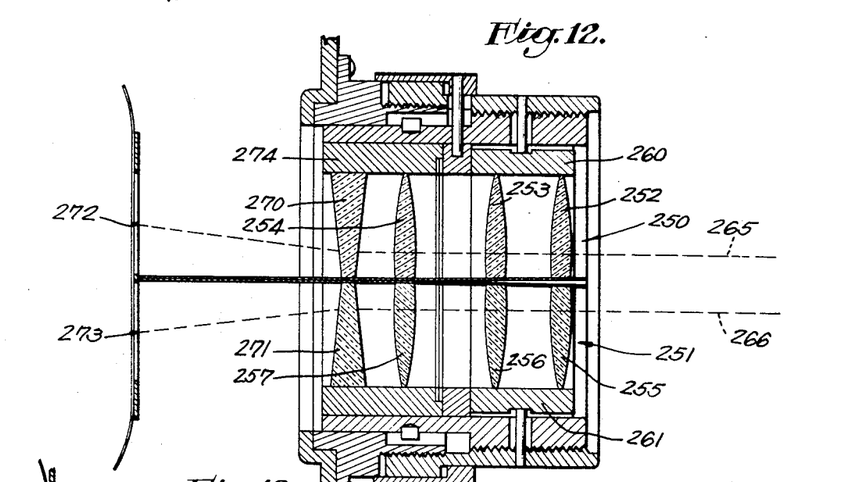

It will also be seen that the embodiment of the invention illustrated in Fig. 12 is a combination of the methods as illustrated in Fig. 4 and Figs. 10, 11 and 13.

Such lens structures find utility in the projecting art, as well as in the camera art. When projecting two images to form constituent screen images which are superimposed to form a composite image, it is necessary to adjust these constituent images for registration as the focus of the lens systems is changed to focus the constituent images on screens of varying distance from the projector. Even in a projector system, however, it is desirable to use a dual-lens system in which the rays drawn from a given point on the screen and through the optical axes of the lens systems intersect the film at points spaced a substantially constant distance apart regardless of the distance focused upon. Stated in other words, the light rays passing through corresponding points of the two image areas will intersect in a point in the objective field of focus of the projection lens systems, regardless of any change of this objective field of focus.

It is an object of the present invention to provide such a lens structure in which focusing movement automatically adjusts the registration of the screen images.

The present invention also finds utility in the taking or projecting of colored pictures, and it is an object of the present invention to provide a dual-lens structure and method for use in such a color photography system.

Many features of the invention are not dependent for utility or novelty upon the simultaneous focusing movement and movement correcting registration, for certain of the features to be hereinafter described are novel regardless of this cooperation. Thus, it is an object of the present invention to provide a lens structure including a plurality of lens elements, only certain of these lens elements being movable in a sidewise direction with respect to the other lens elements.

It is a further object of the invention to provide a novel diaphragm structure for simultaneously controlling the sizes of light-passing apertures, herein illustratively but not restrictively shown in connection with a dual-lens system, as well as to provide a novel operating means for such a diaphragm structure.

A further object of the invention is to provide a pair of lens systems separated by a novel septum whereby cross or stray light rays cannot move from one lens system to the improper frame or image.

Still further objects of the invention reside in other structural details of the lens systems to be hereinafter described, and in the novel relationship of the parts thereof.

Further objects and advantages of the invention will be evident to those skilled in the art from the following description.

Referring to the drawings.

Referring particularly to Fig. 1, I have illustrated the invention in conjunction with a camera 10 including conventional film housings 11 and 12 and a suitable operating mechanism to move the film, indicated by the numeral 13, in front of an aperture plate 14. A suitable housing 15 is used to completely enclose the film as it is advanced frame-by-frame by any suitable advancing mechanism, the details of which are not disclosed, this housing 15 including a front wall 17 to which the lens system 18 of the invention may be secured in a manner to be hereinafter described. In general this lens structure includes two lens systems indicated in general by the numerals 19 and 20. In the preferred embodiment these lens systems are positioned in adjacent relationship, one lens system being vertically disposed above the other.

When such a structure is used in taking motion pictures the relationships are as diagrammatically shown in Fig. 2. Here each lens system is shown as being in the form of a single-lens element. Considering that these lens elements are focused on infinity, rays emanating from a given point and moving through the optical axes of the lens systems 19 and 20 will be substantially parallel. For the sake of illustration I have shown the lens systems of Fig. 2 as being focused on an objective field A—A including a point B. Rays drawn from this point through the optical axes of the lens systems 19 and 20 are indicated by the numerals 22 and 23, these rays impinging on the film at points 24 and 25, these points being spaced from each other a given distance. This distance is ordinarily equal to the center-to-center spacing of the frames of the motion picture film 13. Considering that the lens systems 19 and 20 are moved forward into their dotted line positions 26 and 27 so that they focus on an objective field C—C including a point D, it will be clear that if the relative spacing of these lens systems is not changed the light rays emanating from point D and moving through the optical axes of these lens systems may be represented by lines 28 and 29 intersecting the film at points 30 and 31 which are spaced a distance from each other greater than the spacing of the points 24 and 25. If this change in spacing is not compensated for, it will be clear that any attempt to superimpose the resulting images on the film 13, by aligning the frames or the edges of these image areas, will show two objects spaced from each other rather than a single object as desired. The present invention includes a means for correcting this difficulty, this being done in the preferred embodiment by bodily moving the lens systems (or certain lens elements thereof, as will be hereinafter explained) toward and away from each other. Thus, if lens systems each including but a single-lens element are used, an inward movement thereof into positions indicated by dotted lines 33 and 34 will cause the rays emanating from the point D and moving through the optical axes of these lens systems to assume positions represented by lines 35 and 36 which intersect the film 13 at the points 24 and 25. If, then, the inward movement of the lens structures is properly correlated with the forward-rearward movement thereof to effect a change in focus, corresponding images or points on the two frames will always be spaced a constant distance from each other so that superimposing the framed images, for instance, by simultaneously projecting them onto a screen, will result in all portions of the images being in position for correct registration.

If the lens structure is used for projection purposes the relationships are as disclosed in Fig. 3, assuming that each lens structure includes only a single-lens element. Here a light source 37 is positioned to the rear of the film 13, the light rays being focused by the lens systems 19 and 20 so that point images 38 and 39 appearing on the film will be focused on the screen positioned in an objective field E—E, being superimposed to form a point image F. Assuming that the lens systems 19 and 20 are moved directly forward into their dotted line positions 40 and 41, these light rays emanating from the points 38 and 39 will be focused in an objective field G—G, and the point images will not be in registration. Instead, they will appear at points 42 and 43 spaced a distance from each other. The problem is to bring these points into registration at a single point H, yet if light rays are drawn from the point H through the optical axes of the lens systems 19 and 20, when in their dotted line positions 40 and 41, these lines will intersect the film at points 44 and 45 spaced from the points 38 and 39. If, however, the lens systems 19 and 20 are moved closer together into their dotted line positions indicated by the numerals 46 and 47, these light rays drawn through the optical axes thereof will intersect the points 38 and 39 and will converge on the point H. Thus, the present invention includes a means for and a method of displacing such light rays so that as the focus of the lens systems is changed, these light rays will intersect in a point in the field of focus of the lens systems, and the points of intersection of these rays and the film 13 will always be spaced a constant distance.

It will be clear, however, that it is desirable to use lens structures each having a plurality of lens elements. In this connection it is desirable to move only certain of the lens elements of each lens system sidewise with respect to the other lens elements of the lens system. Thus, if color-corrected lens systems are utilized including plus and minus elements and the plus elements are moved sidewise with respect to each other, the minus elements being relatively immovable in this sidewise direction or vice versa, the direction of sidewise movement will be reversed from that described above. In such instance the sidewise-movable lens elements will be moved away from each other when the lens systems are focused on objects closer and closer to these lens systems in order to obtain the constant spacing of corresponding portions of the images when the lens systems are used in taking pictures, or to obtain automatic registration on a screen positioned variable distances from the lens systems if these lens systems are used in a projection system.

The preferred structure accomplishing such results is best shown in Fig. 4. Referring thereto, the front wall 17 of the camera is shown as providing a cavity 50 including a bottom wall 51 which provides a pocket receiving the aperture plate 14. As best shown in Fig. 4, this aperture plate provides two apertures indicated respectively by the numerals 52 and 53 and separated by a narrow wall 54, these apertures acting to frame the film images, and corresponding in size to the frames appearing on the motion picture film 13.

Slidable into the cavity 50 is a mounting member 54' which carries the lens systems as a unit. This mounting member is preferably connected to the front wall 17 in a manner to be easily removable from the cavity 50. As shown, this may be accomplished by the use of screws 55 extending through a flange 56 of the mounting member and threaded into the front wall 17. In a camera structure these lens systems are usually, though not invariably, disposed vertically above each other, in which case the mounting member must be accurately positioned with respect to the front wall 17 to secure this positioning of the lens systems. To insure this result dowel pins 57 may be extended between the flange 56 and the front wall 17.

The mounting member 54 also includes a forward extending collar 59. This collar is externally threaded, the threads being of relatively small pitch. An adjustment member 60 provides corresponding internal threads which are enmeshed with the threads of the collar 59, this member being suitably knurled so that when manually turned, this member will advance toward and away from the flange 56, carrying the lens systems therewith in a manner to be hereinafter described, thus simultaneously changing the focus of these lens systems.

The forward end of the adjustment member 60 is internally threaded and receives a correspondingly threaded portion of a supporting member 63. The threads formed on the members 60 and 63 are of much steeper pitch than the threads formed on the collar 59 of the mounting member 54. Thus, if the supporting member 63 is prevented from turning when the adjustment member is turned the result is that this supporting member moves in a forward-rearward direction at a rate depending upon the difference in pitch of the two threaded portions of the adjustment member 60. Preferably both these portions are threaded in the same direction so that the amount of the forward-rearward movement of the supporting member 63 represents the additive action of the two threads. However, in other instances a differential thread may be utilized in which case the supporting member 63 will be moved in a forward-rearward direction at a rate which is less than the movement of the adjustment member 60.

Rotation of the supporting member 63 relative to the mounting member 54 is prevented by any suitable means such as a pair of pins 64 extending outward from that portion of the supporting member 63 which telescopes with respect to the collar 59 of the mounting member 54. These pins are shown as extending outward in forward extending keyways or slots 65 formed either partially or wholly through the collar 59. In this manner the supporting member 63 can move in a forward-rearward direction, but any rotation thereof is prevented. This structure thus provides a means for maintaining the lens structures in vertically disposed relationship regardless of a change in focus thereof.

The supporting member 63 is shown as being in the form of a sleeve providing a chamber bounded by a wall 67. The rear end of this sleeve is partially closed by an inward extending flange 68. Disposed in the rear end of the chamber formed by the supporting member 63 and abutting against the flange 68 is a ring 70. The rear portion of this ring provides a stepped cavity in which is positioned a correspondingly stepped lens-supporting means 71. This lens-supporting means may be in the form of a unitary plate providing upper and lower lens-receiving openings 72, but in the preferred embodiment this means is formed of two plates, each plate carrying one of these openings, and providing edge portions 73, as shown in Fig. 8. These edge portions are in engagement with each other and a space therebetween is cut away to form a horizontally disposed channel 74 to receive the septum structure, as will be hereinafter described.

Mounted in the openings 72 of the lens-supporting means 71 are lens elements 75 and 76 which respectively form a part of the lens systems 19 and 20, these lens elements being secured in place by any suitable means.

Figures 5, 6, 7:
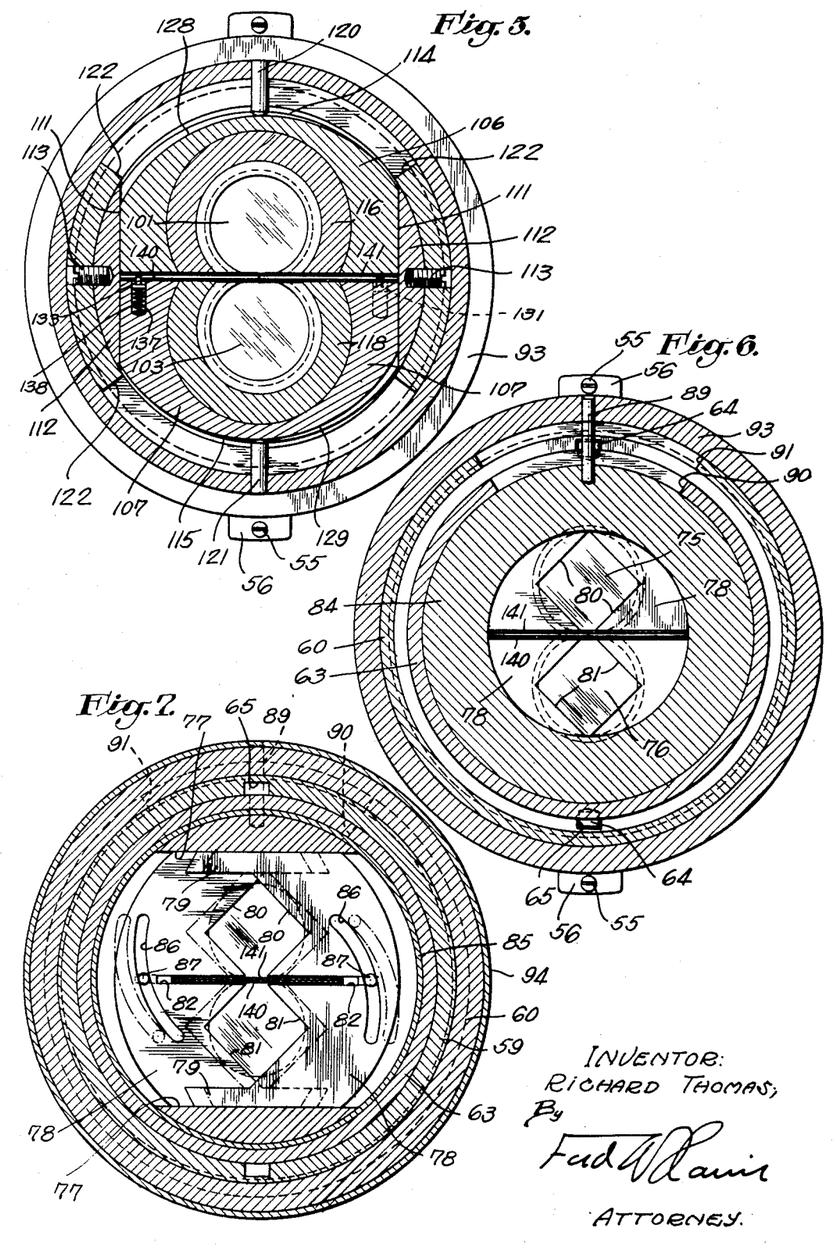
Figs. 5, 6, 7, and 8 are sectional views taken on corresponding lines of Fig. 4.

The structure shown in Fig. 4 includes a diaphragm structure of the moving plate type and positioned immediately in front of the lens elements 75 and 76. As best shown in Figs. 4, 7, and 9 the ring 70 and the lens-supporting means 71 cooperate in providing a horizontally disposed channel bounded by upper and lower walls 77 in which the diaphragm means is positioned. This diaphragm means is shown as comprising two diaphragm members 78, the shape of which is best shown in Fig. 7. These members are arranged to horizontally slide in the channel bounded by the walls 77, and each member defines a pair of legs 79, the legs of the two members being positioned in overlapping relationship. Each diaphragm member provides two V slots 80 and 81 respectively positioned adjacent the lens elements 75 and 76. The V slots of the two diaphragm members cooperate in defining two apertures which are respectively centrally disposed with respect to the optical axes of the lens elements 75 and 76. By moving the diaphragm members toward each other the V slots 80 and 81 will cooperate in defining successively smaller light-transmitting apertures of substantially square shape. If these members are moved away from each other, the apertures will increase in size, thus permitting more light to pass through the lens elements 75 and 76. It should be understood, however, that it is not necessary to form the slots 80 and 81 of V-shape. Various other shapes may be used, such as U-shaped, oval, or semi-circular slots.

As best shown in Fig. 7, the central portion of each diaphragm member 78 is cut away to form a slot 82, these slots cooperating with each other to form a channel through which the septum means may extend, as will be hereinafter set forth.

Extending in front of the channel retaining these diaphragm members 78, and holding these members therein, is a diaphragm control member 84. This member is rotatably mounted in the chamber of the supporting member 63 and preferably includes a rearward extending flange 85 which fits into a corresponding channel of the ring 70. This diaphragm control member 84 serves to simultaneously move the diaphragm members 78 so as to change the size of the light apertures formed thereby. This may be accomplished by providing a spirally disposed cam slot 86 in each of the diaphragm members 78 and into which respectively extend pins 87 protruding rearwardly from the diaphragm control member 84. If the slots 86 were concentric with respect to the supporting member 63 no advancing movement of the diaphragm members would be possible. If, however, these slots are made in the form of a spiral, as shown, turning of the diaphragm control member 84 relative to the supporting member 63 will simultaneously move the diaphragm members 78 toward or away from each other, thus changing the size of the apertures.

This turning of the diaphragm control member 84 may be effected through the use of a pin 89 extending outward from the member 84 and through an arcuate channel 90 cut through the supporting member 63 to permit arcuate movement of the pin 89. Similarly, an arcuate channel 91 is formed through the adjustment member 60 and is materially wider than the pin 89 so that the adjustment member 60 can move forward or rearward without the walls of the channel 91 coming into engagement with the pin 89. If desired the outer end of the pin 89 may be extended beyond the adjustment member 60 so as to be manually movable. In the preferred embodiment, however, I prefer to utilize a ring 93 into which the outer end of this pin extends, this ring being journalled on the adjustment member 60 and carrying a rearward extending sleeve 94 which, if desired, may extend rearward a sufficient distance to cover any space which may exist between the rear wall of the adjustment member 60 and the mounting member 54. Rotation of this ring will thus effect a change in aperture size. Suitable calibrations may be placed on this ring or on the adjustment member 60 or on both so as to indicate the size of the apertures to the operator at any time.

Positioned in the forward end of the chamber formed by the supporting member 63 is an expansible structure 100 which, in the preferred embodiment, carries the front lens elements of the lens systems 19 and 20, these lens elements of the lens system 19 being indicated in general by the numerals 101 and 102, while the lens elements of the lens system 20 are indicated by the numerals 103 and 104. This expansible structure is designed so that the elements 101 and 102 may be moved laterally with respect to the elements 103 and 104, thus correcting the registration as the focus of the lens systems 19 and 20 is changed.

In the embodiment shown this expansible structure includes upper and lower half members in the form of segments 106 and 107 positioned between the forward wall of the diaphragm control member 84 and a forward aperture plate 108 suitably secured in the front end of the supporting member 63 and carrying apertures 109 and 110 through which passes the light reaching the lens systems 19 and 20. As best shown in Fig. 5, the segments 106 and 107 provide end faces 111 which are vertically disposed and which slidably engage guide members 112 which are retained in the supporting members 63 as by screws 113. These guide members thus form a vertical guide means in which the segments 106 and 107 are accurately and closely guided for vertical movement, these segments providing peripheral surfaces 114 and 115 which are of slightly smaller diameter than the internal diameter of the walls 67 so as to permit vertical movement of the segments 106 and 107 relative to each other. The lens elements 101 and 102 are suitably mounted so as to move with the segment 106. In the form shown this is accomplished by the use of lens-retaining members 116 and 117 suitably secured inside the segment 106 and carrying these lens elements. Similarly, the elements 103 and 104 are retained in the segment 107 as by lens-retaining members 118 and 119.

In the preferred embodiment the upper and lower portions of the expansible structure 100 are resiliently forced outward so that the segment 106 resiliently engages a pin 120, while the segment 107 resiliently engages a pin 121. These pins are carried by the adjustment member 60 and respectively extend inward through arcuate slots 122 and 123 formed through the supporting member 63, these slots being of greater width than the pins 120 and 121 so as not to interfere with relative movement between the supporting members 63 and the adjustment member 60. The innermost end of these pins respectively engage a cam surface of the segments 106 and 107. In the form shown these pins extend into grooves 125 and 126 respectively cut into the peripheral walls 114 and 115 of the segments 106 and 107, the lower walls of these grooves forming the cam surface. These cam surfaces are indicated in Fig. 5 by the numerals 128 and 129, and, as shown, these cam surfaces are not parallel to the peripheral surfaces 114 and 115. Instead, the grooves 125 and 126 are of varying depth around these peripheral surfaces so that as the adjustment member 60 is turned the pins 120 and 121 engage different portions of this cam surface, thus simultaneously moving the segments 106 and 107 toward or away from each other depending upon the direction of rotation of the adjustment member 60. Usually the amount of such lateral movement of these segments is relatively small, and the cam surfaces 128 and 129 are so designed that correct registration is obtained regardless of the change in focus of the lens systems 19 and 20 as previously described. The necessary curvature of these cam surfaces can be calculated or determined empirically. Furthermore, the relative spacing of the segments 106 and 107 can be adjusted in a preliminary way by changing the axial position of the pins 120 and 121 with respect to the adjustment member 60.

It will thus be clear that the lens elements 75, 101 and 102 are simultaneously moved in a forward-rearward direction to change the focus, this being accomplished by turning the adjustment member 60, and it will also be clear that this movement of the adjustment member 60 changes the lateral position of the lens elements 101 and 102. Similarly, the adjustment member 60 simultaneously moves the lens elements 76, 103, and 104 to change the focus of the lens system 20 in amount corresponding to the change in focus of the lens system 19, this adjustment member also changing the lateral position of the lens elements 103 and 104 in degree corresponding to the lateral movement of the lens elements 101 and 102. The result is that regardless of the front zone or objective field on which the lens structures are focused, the film images in the image field will always be in correct registration and parallax will be eliminated as to any objects in this objective field of focus.

In the form shown the segments 106 and 107 are resiliently moved outward by means of four pins 130, 131, 132, and 133 positioned as best shown in Figs. 5 and 9. Each of these pins extends from a correspondingly positioned cavity and is resiliently moved through the action of a suitable spring. Thus, considering the pin 133 (see Fig. 5), this pin extends into a cavity 137 of the segment 107 and is resiliently forced upward by a spring 138 retained in this cavity. This pin extends through a correspondingly positioned opening of a septum member 140 and resiliently bears against a septum member 141. The latter member is suitably secured to the lower end of the segment 106, while the septum member 140 is suitably secured to the upper end of the segment 107. Similarly, the pin 131 extends upward from a cavity in the segment 107 and resiliently engages the septum member 141. In like manner the pins 130 and 132 extend downward from corresponding cavities of the segment 106 and through openings of the septum member 141, thus resiliently engaging the top surface of the septum member 140. Any other suitable means for securing this resilient outward movement can be utilized. In many instances it is possible to dispense with two or more of the resiliently movable pins, relying upon the other pins to effect this relative outward movement of the segments 106 and 107 and holding these segments in resilient contact with the pins 120 and 121. In other instances it is possible to operatively connect the pins 120 and 121 directly to the segments 106 and 107 rather than relying upon a resilient engagement to hold these segments in contact with these pins.

The septum members 140 and 141 are an important factor in preventing cross rays between the lens systems 19 and 20. As best shown in Fig. 9 the forward ends of these septum members are enlarged to cooperate with the pins 130 and 132 as previously described. The rear portions of these septum members extend through the channels 82 and 74 previously described and extend rearward to a position adjacent the wall 54 of the aperture plate, as best shown in Fig. 4, thus forming a septum means which completely separates the light rays respectively passing through the two lens systems 19 and 20. These septum members are formed of relatively thin spring material, and it is sometimes possible to utilize the spring action of the septum members themselves to resiliently force the segments 106 and 107 outward, thus eliminating the necessity of the resiliently moving pins 130 to 133 inclusive.

If desired, the channel 74 may be of a width which is just sufficient to pass the septum members 140 and 141. In this instance it will be clear that any outward movement of the segments 106 and 107 will slightly deform the forward portions of these septum members when these segments are moved outward. In the drawings I have shown these segments in an intermediate position, Fig. 4 illustrating the forward ends of the septum members 140 and 141 in slightly spaced relationship. While it is usually desirable to use two septum members, it is possible in some instances to eliminate one of these members relying upon the other to prevent any cross rays which might be detrimental.

I find it preferable to space the lens systems 19 and 20 so that the optical axes thereof are positioned a distance apart substantially equal to the center-to-center spacing of the apertures 52 and 53 though this is not an absolute necessity. In other words, this spacing of the optical axes may be substantially equal to the center-to-center spacing of the film images. If relatively large lens elements are being used, it is necessary to grind off the adjacent portions of the lens elements forming the lens systems 19 and 20. Thus, in Figs. 4 to 8 I have shown the inner adjacent portions of these lens elements as being ground flat so as to permit the lens elements to be positioned so that their optical axes are spaced as indicated above.

The effectiveness of the dual-lens system and the coordinated adjustments thereof can be readily demonstrated by actual test. For instance, if the pins 120 and 121 are removed it is entirely possible to focus the lens systems 19 and 20 on an object at a given distance from the camera and at the same time bring the images into correct relationship with respect to the frames of the film. Any attempt to photograph objects at other distances will, however, give rise to a parallax action. Thus, if an attempt is made to photograph an object moving toward the camera, the pins 120 and 121 having been removed and thus rendered inoperative to control the spacing of the segments 106 and 107, the resulting images of the object cannot be superimposed by bringing the edges of the image areas into registration, and this is true even though the focus of the lens systems is changed as the objects move toward the camera. Any attempt to project images thus produced will result in failure in view of this parallax action or lack of registration. If, however, the pins 120 and 121 are brought into operative relation with the segments 106 and 107, it is possible to photograph the same object moving toward the camera and correspondingly adjust the focus so that the object is at all times in correct focus and it will be found upon subsequent projection that the images of the object are in exact registration. In fact, to all intents and purposes, the present invention wipes out any apparent parallax in the objective field of focus. Any parallax outside of this objective field of focus becomes unobjectionable in view of the fact that objects out of this field of focus are naturally blurred and indistinct.

Further, if the lens system herein disclosed is used in projection work it will be found that in the absence of the pins 120 and 121, it is impossible to bring the images into correct registration unless manual adjustment of the segments 106 and 107 is effected, for change in focus of the lens systems 19 and 20 to compensate for changes in distance between the projector and the screen will throw the images out of registration. If, however, the pins 120 and 121 perform their normal function any manual adjustment of the segments 106 and 107 to effect registration is unnecessary.

While I have shown only the front elements of each lens system as being laterally displaceable, it should be understood that I am not limited to this construction. If desired all of the lens elements can be made laterally displaceable through the action of the pin 120. Usually, however, it is entirely satisfactory to move only the front element or elements of each lens system. Furthermore, this method of lateral adjustment is novel regardless of the correlated movement between the focusing means and the lateral adjustment means. However, no attempt has been made in Fig. 4 to show color-corrected lens systems and it will be clear to those skilled in the art that various combinations of plus and minus lens elements may be used, as well as lens elements of different kinds of transparent material.

Even if each lens system includes a plurality of lens elements, it is not always necessary to simultaneously move all of these elements to effect focus. In some instances it is possible to change the focus of the system by moving one or more of these elements relative to the other.

Nor is it always necessary to use the form of the invention heretofore described in effecting the displacement of the light rays. Various other systems are possible, one of which is diagrammatically shown in Fig. 10. Here the front wall 17 threadedly receives a mounting member 160 which has a forward extending sleeve 161 which is bifurcated to define a channel 162. A pin 163 is journalled in the bifurcations and carries a pinion 164. Rotation of the pin 163 as by a thumb wheel 166 will thus turn the pinion 164.

Slidably disposed in the sleeve 161 is a barrel 170 which carries teeth 171 meshing with the pinion 164 so that when the pinion is turned the barrel 170 is moved in a forward-rearward direction. Rotation of the barrel 170 relative to the sleeve 161 is prevented by one or more pins 172 fitting into corresponding slots 173 of the sleeve 161. Any other suitable mechanism for effecting this forward-rearward movement without rotation of the barrel 170 may be used.

In Fig. 10 I have diagrammatically shown lens elements 175 and 176 mounted in the upper portion of the barrel 170 and above a septum member 177, these lens elements forming a part of a lens system 178. Similarly, a lens system 179 includes lens elements 180 and 181 which are positioned in the lower portion of the barrel 170 below the septum 177. All of these lens elements move in a forward-rearward direction to change the focus of the system when the thumb wheel 166 is turned.

Also carried by the barrel 170 are prisms 185 and 186 respectively positioned above and below the septum 177 and positioned base-to-base to respectively deflect the rays moving through the lens systems 178 and 179 inward. In addition, prisms 188 and 189 are mounted in fixed relation with respect to the mounting member 160 and respectively bend the light rays moving through the prisms 185 and 186. In the form shown the prisms 188 and 189 are mounted apex-to-apex, these prisms being held stationary regardless of the focusing movement of the barrel 170.

In considering the operation of this form of the invention, a light ray 190 emanating from an infinitely positioned object will move through the optical axes of the lens elements 175 and 176 and will be deflected inward by the prism 185 as indicated by the numeral 191. The prism 188, being oppositely disposed with respect to the prism 185 will bend this light ray to form a ray 192 impinging on the film at a point 193. If now we consider that the lens elements 175 and 176 and the prisms 185 and 188 all are moved forward to focus on a field including a point 194, it will be clear that the light ray drawn from this point and passing through the optical axis of the lens system 178 will move outward to some point 195 on the film, thus destroying the registration as previously set forth. If, however, the prism 188 is maintained stationary, and the prism 185 is moved forward with the lens elements 175 and 176 into their dotted line positions, the ray emanating from the point 194 and passing through the optical axis of the lens system 178 will be substantially as shown by the numeral 196. The prism 185 will deflect this ray as shown by the dotted line 197 and this ray will then strike the prism 188 at a distance closer to the septum 177 than would be the case if the distance between the prisms 185 and 188 had not been increased. The result is that the ray is deflected by the prism 188 to form a ray 198 which intersects the film at the point 193 previously mentioned. Similar remarks apply to the rays passing through the optical axis of the lens system 179 and to the rays passing through the outer portions of the lens systems 178 and 179. Stated in other words, the changing of the relative spacing of the prisms 185 and 186 changes the power of these prisms and shifts the rays in such a way that the point of impingement on the film will be at a point which is always correspondingly placed with respect to the frame of the film regardless of the change in focus. This system thus accomplishes in a somewhat different way the same things as are accomplished by the system shown in detail in Fig. 4. In addition the form shown in Fig. 10 eliminates the sidewise movement of the lens elements, thus making a cheaper construction.

Any attempt to use a single-lens system in conjunction with a pair of prisms positioned between this lens system and the film for the purpose of splitting the rays into two beams respectively exposing adjacent frames of the film necessitates the use of prisms of high deflecting power. Thus, the angle between the forward and rearward surfaces of such prisms is necessarily large, with the result that inevitable distortion and excessive dispersion of the light rays are present. I have found that the permissible angle should not be substantially greater than 15° if distortion and excessive dispersion are to be eliminated. In the present invention it is possible to use prisms of very small angle. This follows from the use of two lens systems positioned in adjacent relationship, for the rays passing through these respective lens systems are already so spaced apart that the prisms need only deflect the rays a small amount. A dual-lens system combination used in conjunction with a prism structure thus results in the production of undistorted images.

It can usually be stated as a general proposition that the optical axes of the lens systems should be close together. The forms of the invention shown in Figs. 4 and 10 wherein the optical axes of the lens systems are positioned apart a distance not greater than the center-to-center spacing of the frames are particularly desirable when used in conjunction with the exposing or projecting of 16 mm. film wherein the center-to-center spacing of the frames is about .300", or film of even smaller dimension. If the same principles are applied to the design of a lens structure for use in conjunction with conventional 35 mm. or 70 mm. film, the lens systems would be constructed so that their optical axes are spaced from each other a distance not greater than the center-to-center spacing of the frames. Usually, however, satisfactory results cannot be obtained from such systems because of the fact that the lens systems register from a greatly different viewpoint. Therefore, in the production of commercially successful films or screen images by the use of such larger films slight modifications must be made in the system. Figs. 11, 12, and 13 indicate three ways in which the same principles as hereinbefore described can be applied to lens systems used in conjunction with large film.

In each of these alternative systems illustrated in Figs. 11, 12, and 13, the lens elements of the two lens systems are ground away at their adjacent edges so that the optical axes of these lens systems can be brought into close proximity. When the systems shown in Figs. 4 and 10 are used in conjunction with 16 mm., the optical axes thereof are spaced substantially .300" apart. It has been found that with this spacing very satisfactory results can be obtained. Thus, the forms of the lens structures shown in Figs. 11, 12, and 13 may be so designed that the optical axes thereof are substantially .300" apart relying upon the prism structure to be hereinafter described to spread the light rays so that the images appearing on adjacent frames of a film will be in exact registration when superimposed. This spacing dimension of .300" is not, however, to be considered the maximum permissible spacing, for somewhat wider spacings can sometimes be used. Rather, this dimension is illustrative of one form which will give very satisfactory results. In some instances it is possible and desirable to bring these optical axes even closer together, relying upon the prisms to secure the desired spreading action. Thus, these optical axes can be separated .150", more or less, if desired.

In Fig. 11 I have illustrated one form of structure which can be used for this larger type of film. Here lens systems 200 and 201 are utilized, the former including lens elements diagrammatically indicated by the numerals 202 and 203 suitably mounted in a barrel 204 above a septum 205. Similarly, the lens system 201 is diagrammatically shown as including lens elements 206 and 207 mounted in the barrel 204 below the septum 205. Rays 208 and 209 coming from an infinitely positioned point are shown as respectively passing through the optical axes of the lens systems 200 and 201. Following the concepts set forth above, these rays will be positioned a distance apart substantially equal to .300", or in some instances less. These rays are respectively deflected outward by prisms 210 and 211 mounted to move with the barrel 204 in a manner similar to that previously described with reference to Fig. 10. As shown the ray 208 is deflected as indicated by the numeral 212 and reaches a rear prism 215 which is mounted in stationary relationship with a mounting member 216 in which the barrel 204 slides. This prism deflects the ray 212 inward to form a ray 218 which reaches the film at a point 220. Similarly, the ray 209 is shown as being deflected by the prism 211 to form a ray 221 which is deflected inward by a prism 222 so that it reaches the film at a point 223. The points 220 and 223 are positioned a distance apart substantially equal to the center-to-center spacing of the frames.

If now we consider that the prisms 210 and 211 are moved forward with the lens elements 202, 203, 206, and 207 to focus on a field closer to the lens systems, a light ray 225 emanating from a point in this field and moving through the optical axes of the lens system 200 will assume a position indicated by the numeral 228 and will be deflected by the prism 210 as indicated by the numeral 229. Due to the fact that the spacing between the prisms 210 and 215 has been changed because of this change in focus, the light ray 229 will be deflected as indicated by the numeral 230 and will reach the point 220 previously described. In the absence of this change in spacing between the prisms 210 and 215 the light ray would not reach the point 220, thus destroying the registration as previously described. Similar remarks apply to the ray of light drawn from the same point in the newly-focused objective field and passing through the optical axis of the lens system 201. This ray will reach the point 223 if the position between the prisms 210 and 215 has been changed.

With such a system the angle of the prisms 210 and 211 will usually be greater than the angle of the prisms 215 and 222. It has been found, however, that the angle of the prisms 210 and 211 need not be so great as to introduce distortion into the image. The prisms 215 and 222 act to maintain the proper registration.

Another system of securing automatic registration on a larger-sized film is shown in Fig. 12. Here lens systems 250 and 251 respectively include lens elements 252, 253, 254, 255, 256, and 257. In this form of the invention automatic registration is obtained by a structure similar to that shown in Fig. 4, namely, by mounting the elements 252 and 253 in a cam-controlled segment 260 and mounting the elements 255 and 256 in a cam-controlled segment 261, these segments being formed as previously described and being actuated by mechanism very similar to that described in detail with respect to Fig. 4. In this form of the invention spreading movement of the front lens elements is correlated with the focusing movement as previously described so as to obtain correct registration.

Light rays coming from an infinitely disposed point and respectively moving through optical axes of the lens systems 250 and 251 are indicated by numerals 265 and 266. These light rays are spaced apart a distance which is less than the center-to-center spacing of the film frames or film image areas, prisms 270 and 271 being utilized for spreading these light rays so that they impinge at central points of adjacent frames indicated respectively by numerals 272 and 273. These prisms 270 and 271 are mounted apex-to-apex in a mounting member 274 which may also retain the lens elements 254 and 257. It will thus be clear that the prisms 270 and 271 move in a forward-rearward direction along with the lens elements 254 and 257 when the focus of the lens systems is changed. The movement of the segments 260 and 261 is correlated with this focusing movement so as to obtain proper registration following the principles hereinbefore set forth.

In Fig. 13 I have shown still another modified form of the invention which may be used to advantage. This form is similar to the forms shown in Figs. 11 and 12 in that the optical axes of the lens systems can be spaced apart a distance less than the center-to-center spacing of the frames or image areas. In this form two lens systems 300 and 301 are shown as respectively including lens elements 302 and 303 and lens elements 304 and 305. These lens elements are mounted in a barrel 307 slidable relative to a mounting member 308 in a manner similar to that shown in Fig. 11. Similarly, a prism means mounted in fixed relation to the film is shown, this prism means being diagrammatically shown as comprising prisms 310 and 311 mounted in the mounting member 308. In this form the prisms 310 and 311 have two functions. In the first place, they bend the light rays outward so that corresponding points of the image areas on the film are spaced a distance apart substantially equal to the center-to-center spacing of these image areas. In the second place, the change in spacing of the lens systems and the prisms acts to maintain this desired separation of the images on the image areas regardless of the change in objective field of focus. Thus, as previously pointed out, in the absence of any such compensating means light rays drawn from a given point in the objective field of focus through the optical axes of the lens systems will meet the film at points which do not remain spaced from each other a constant distance. By effecting a change in the relative positions of these lens systems with respect to the prisms 310 and 311, this change in spacing of the points is eliminated and the points will automatically be maintained spaced from each other a constant distance, thus forming images which are correspondingly placed with respect to the two image areas of the film. This combination can also be used in projection systems, following the principles hereinbefore set forth.

It will be understood that in any of the forms shown in Figs. 10, 11, 12, and 13 a diaphragm structure such as shown in detail in Figs. 4 and 7 can be used.

It should be clear that the spacing of the optical axes of the lens systems in the forms shown in Figs. 11, 12, and 13 can be any desired distance less than the center-to-center spacing of the film. In some instances it is possible to reduce this center-to-center spacing to .150" or less, relying upon the prisms to move the light rays outward into correct relationship with the frames. In this way the lens systems do not have greatly different viewpoints and very satisfactory results can be obtained.

Various modifications of the forms herein disclosed in detail will be apparent to those skilled in the art and it should thus not be understood that I am limited to these illustrative forms. The fundamental concept herein involved is that of displacing the light rays in response to changes in focus of the lens systems and it has been found that by proper proportioning and placing of the parts exact registration can be effected to obtain the very desirable results hereinbefore mentioned. This is true regardless of whether the concepts herein involved are applied to a camera or a projection system. So also, this is true regardless of whether each frame is twice exposed, or projected, by a single-frame advance resulting in double exposure or projection of each frame or whether the film is advanced more than one frame at a time so that double-exposure or double-projection is not effected.

I claim as my invention:

1. The method of double simultaneous photography which comprises, first forming selected light rays from a given objective source in the objective field into two equal parts, simultaneously focusing each part of such rays throughout the range of the objective fields upon definitely spaced apart points in the image field along optical axes, spacing such axes closely adjacent to each other to substantially eliminate visible parallax, and deflecting each part of said rays between the focusing station and the image field to maintain constant separation and substantially exact registration of the image fields.

2. The method of multiple simultaneous photography which comprises selecting the rays within a predetermined range and rejecting those rays outside of such range by lenses the optical axes of which are spaced closely adjacent to each other to substantially eliminate visible parallax, dividing such light rays from a given source in the objective fields into equal parts, simultaneously focusing throughout the range of objective fields each part of such rays upon definitely spaced apart points in the image fields, and deflecting the selected rays between the focusing station and the image fields and preserving constant separation and substantially exact registration of the image fields.

3. The method of projecting multiple photographic images in superimposed relation upon a screen, which comprises passing the light rays from a given objective source in equal parts through double image areas in the object fields and along optical axes which are spaced apart not more than the center to center spacing of said image areas, focusing throughout the range of image fields each part of such rays transmitted through said double image areas, and simultaneously therewith deflecting the corresponding rays along each optical axis between the focusing stations and the image areas to meet in a point on a plane in the image field of focus to preserve registration of the images without separation or fringe.

4. The method of producing on a screen a composite of superimposed images which comprises first forming the light rays from a given objective source into two equal parts, simultaneously focusing each part of such rays throughout the range of the objective fields upon definitely spaced apart points on a film along optical axes which are spaced to substantially eliminate visible parallax, deflecting each part of the focused rays between the focusing station and the image field to maintain constant separation and exact registration of images imposed on such film, and projecting on a screen in superimposed relation the double images so produced on such film.

5. Apparatus for double simultaneous photography, comprising means for selecting and dividing light rays from a given source in the objective field into two equal parts, means for simultaneously focusing each part of such rays throughout the range of objective fields upon definitely spaced apart points in an image field, said means embodying lenses the optical axes of which are spaced to eliminate substantially visible parallax, and means for responsively deflecting each part of the focused rays to maintain constant separation of images produced by such rays upon image fields.

6. Apparatus for double simultaneous photography comprising means for selecting the rays within a predetermined range and projecting those rays outside of such range, said means embodying lens systems the optical axes of which are spaced to substantially eliminate visible parallax, means for simultaneously focusing each part of such light rays throughout the range of objective fields upon definitely spaced apart points in the image fields, and means deflecting the selected rays between the focusing station and the image fields and preserving constant separation and exact registration of the image fields, said means embodying prism systems spaced between said focusing station and said image fields.

7. The method of multiple simultaneous photography which comprises, first forming selected light rays from a given objective source in the objective field into equal parts, simultaneously focusing each part of such rays throughout the range of the objective fields upon definitely spaced apart points in the image field along optical axes, spacing such axes closely adjacent to each other to substantially eliminate visible parallax, and deflecting each part of said rays between the focusing station and the image field to maintain constant separation and substantially exact registration of the image fields.

8. In combination: two adjacent lens systems each focused on a given objective field in front thereof and each focused on a given image field to the rear thereof and providing a pair of corresponding framed images, whereby light rays drawn from a given point in said objective field and respectively passing through the optical axes of said two lens systems are spaced from each other in the zone between said lens systems and said image field and intersect said image field in a pair of points spaced from each other a given distance substantially equal to center-to-center spacing of said framed images; septum means extending between said lens systems, focusing means for simultaneously moving both of said lens systems to change the objective field on which said lens systems are focused thereby tending to change the spacing of said light rays in said zone and consequently said given distance at which said points are spaced; and means cooperating with said focusing means and functioning upon a change in the objective field of focus of said lens systems for displacing the optical axes of said lenses to overcome visible parallax, and for maintaining said given distance between said pair of points substantially constant throughout the range of objective fields of focus.

9. In a lens structure, the combination of: a pair of lens systems adjacent each other, each lens system including a plurality of lens elements; septum means extending between said lens systems, focusing means for simultaneously moving said lens systems to correspondingly change the focus thereof; and means operatively connected to said focusing means for moving the front lens elements only of said lens systems in a direction toward and away from each other in response to a movement of said focusing means, whereby deflective action is caused by the lens element not so moved.

10. A combination as defined in claim 9 in which said last-named means includes a cam means operatively connecting said focusing means and said lens elements to move said lens elements toward and away from each other.

11. In a lens structure positioned in front of a film, the combination of: a pair of lens systems positioned in adjacent relationship and focused on a given field of focus in front thereof, whereby light rays drawn from a given point in said field of focus and respectively passing through the optical axes of said lens systems intersect said film at points spaced from each other and respectively lying in corresponding frames of said film, means for displacing the optical axes of said lenses to overcome visible parallax and maintain said spacing of points, means for moving said lens systems in a forward-rearward direction to change the field on which said lens systems are focused thereby tending to change the distance between corresponding frames of said film; and means operating in conjunction with said focusing movement for maintaining constant the separation of said corresponding frames of said film throughout the range of objective fields of focus.

12. In a lens structure, the combination of: a mounting member; a supporting member movably mounted with respect to said mounting member; guide means cooperating with said mounting member and said supporting member for limiting the movement of said supporting member to a movement in a forward-rearward direction; means for moving said supporting member relative to said mounting member in said forward-rearward direction; two lens systems mounted in said supporting member in adjacent relationship and movable in a forward-rearward direction therewith, each lens system including a plurality of lens elements; septum means extending between said lens systems guide means associated with said supporting member and guiding said lens systems to move the front elements only of said lens systems sidewise with respect to each other in said supporting member; and mean for moving said front elements only of each lens system relative to the other in said sidewise direction, whereby deflective action is caused by the lens elements not so moved.

13. In a lens structure, the combination of: a mounting member; a supporting member movably mounted with respect to said mounting member; guide means cooperating with said mounting member and said supporting member for limiting the movement of said supporting member to a movement in a forward-rearward direction; means for moving said supporting member relative to said mounting member in said forward-rearward direction; a pair of lens structures operatively connected to said supporting member to move therewith in said forward-rearward direction; a guide means associated with said supporting member and guiding the front elements only of said lens systems to move toward and away from each other; and means operatively connecting said adjustment member and said lens systems to relatively move such elements in a direction determined by said guide means.

14. An optical diaphragm comprising a plurality of relatively adjustable members cooperatively defining a plurality of separate light openings, each member of which is disposed in the path of the light rays passing through all of said openings, and means for adjusting said members with respect to one another to increase and decrease simultaneously the size of all of said openings.

15. An optical diaphragm comprising two relatively adjustable plates cooperatively defining a plurality of separate light openings, each plate disposed in the path of the light rays passing through all of said openings, and means for adjusting said plates with respect to each other to increase and decrease simultaneously the size of all of said openings.

16. In a lens structure, the combination of: lens-mounting means; a pair of lens systems mounted substantially edge-to-edge in said lens-mounted means; a plurality of diaphragm members each disposed in the path of the light rays passing through both of said lens elements and cooperating in providing a pair of light-passing apertures; and means for simultaneously and correspondingly moving said diaphragm members to simultaneously increase or decrease the size of said light-passing apertures.

17. In a lens structure, the combination of: a pair of lens elements positioned substantially edge-to-edge; walls forming a single diaphragm-receiving chamber said chamber extending across the light rays passing through both of said lens elements; a plurality of diaphragm members each disposed in the path of light rays passing through both of said lens elements, said members movable in said chamber and cooperating in defining a pair of light-passing apertures adjacent said lens elements; and means for simultaneously moving said diaphragm members to simultaneously change the size of said light-passing apertures.

18. In a lens structure, the combination of: lens-mounting means; a pair of lens elements mounted substantially edge-to-edge in said lens-mounting means; a plurality of diaphragm members each disposed in the path of the light rays passing through both of said lens elements and each providing a pair of slots therein, said slots of said members cooperating to define a pair of apertures through which pass the light rays passing through said lens elements; guide means controlling the movement of said diaphragm members; and means simultaneously moving said diaphragm members relative to said guide means to change the size of said apertures.

19. A combination as defined in claim 18 in which said last-named means includes spiral slots in said diaphragm members and a diaphragm control member carrying pins which extend into said spiral slots to simultaneously move said diaphragm members.

20. In a lens structure, the combination of: a pair of lens systems positioned side-by-side, each lens system including a plurality of lens elements; a supporting member; means securing the rear ones of said lens elements of each lens system to said supporting member; means for movably supporting the front lens elements of each of said lens systems to move toward and away from each other in said supporting structure; and means for moving said front lens elements toward and away from each other.

21. In a lens structure, the combination of: a mounting member providing threads thereon; a supporting member slidable relative to said mounting member to move in a forward-rearward direction; an adjustment member threaded to said mounting member and carrying threads of different pitch from said first-mentioned threads and threadedly engaging said supporting member whereby rotation of said adjustment member advances same relative to said mounting member and advances said supporting member at a rate different from the rate of advance of said adjustment member; a pair of lens elements mounted on said supporting member to move in said forward-rearward direction therewith; and means operatively connecting said adjustment member to said lens elements to move said lens elements toward and away from each other in response to a movement of said adjustment member.

22. In a lens structure, the combination of: a rear aperture plate including a pair of apertures separated by a wall; a front aperture plate including a pair of apertures separated by a wall; septum means extending between said walls; two lens systems, one positioned on each side of said septum means and in alignment with the apertures of said front and rear aperture plates, and a single diaphragm device for controlling passage of light through both of said lens systems and having two apertures, one in alinement with the axis of each lens system.

23. In a lens structure, the combination of: a rear aperture plate including a pair of apertures separated by a wall; a front aperture plate including a pair of apertures separated by a wall; suptum means extending between said walls; two lens systems, one positioned on each side of said septum means and in alignment with the apertures of said front and rear aperture plates; means for moving said lens systems toward and away from each other, and a single diaphragm device for controlling passage of light through both of said lens systems and having two apertures, one in alinement with the axis of each lens system.

24. In a lens structure, the combination of: a pair of lens systems positioned in adjacent relationship and focusing images on a film; septum means extending between said lens systems, means for simultaneously moving said lens systems to focus same; a front pair of prisms between each of said lens systems and said film and operatively connected to said lens systems to move therewith; and a rear pair of prisms between each of said lens systems and said film for deflecting the rays moving through said lens systems, said rear pair of prisms being stationary.

25. A combination as defined in claim 24 in which said front pair of prisms is positioned base-to-base and in which said rear pair of prisms is positioned apex-to-apex.

26. A combination as defined in claim 24 in which said rear pair of prisms is positioned base-to-base and in which said front pair of prisms is positioned apex-to-apex.

27. A combination as defined in claim 24 in which said rear pair of prisms is positioned base-to-base and in which said front pair of prisms is positioned apex-to-apex and in which the angle of each of the prisms of said front pair is greater than the angle of each of the prisms of said rear pair.

28. A combination as defined in claim 9 including two prisms positioned apex-to-apex in the zone to the rear of said lens systems to deflect the light rays passing through said lens systems, one prism being positioned in alignment with one lens system and the other prism being positioned in alignment with the other lens system.

29. A combination as defined in claim 9 used in conjunction with a pair of frames of a film and in which said lens systems are positioned apart such a distance that the spacing of the optical axes thereof is less than the center-to-center spacing of said frames, and including a prism to the rear of each lens system to deflect the rays passing through said lens systems outwardly.

30. In a lens structure for use in conjunction with a film providing a pair of frames separated by a space, the combination of: two lens systems positioned in adjacent relationship and respectively positioned in front of said frames; two prisms respectively positioned between said lens systems and their corresponding frames; and septum means extending forward from said space separating said frames and positioned between said prisms and between said two lens systems to separate the light rays respectively passing through said lens systems and said prisms.

RICHARD THOMAS.